United States Patent
Yebka et al.

(10) Patent No.: US 9,324,993 B2
(45) Date of Patent: Apr. 26, 2016

(54) LITHIUM-ION CELL AND ENERGY DENSITY THEREOF

(71) Applicant: Lenovo (Singapore) Pte. Ltd., Singapore (SG)

(72) Inventors: Bouziane Yebka, Apex, NC (US); Joseph Anthony Holung, Wake Forest, NC (US); Tin-Lup Wong, Chapel Hill (JP); Philip John Jakes, Durham, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 218 days.

(21) Appl. No.: 14/020,603

(22) Filed: Sep. 6, 2013

(65) Prior Publication Data

US 2015/0072230 A1    Mar. 12, 2015

(51) Int. Cl.
*H01M 4/13* (2010.01)
*H01M 4/1391* (2010.01)

(52) U.S. Cl.
CPC .............. *H01M 4/13* (2013.01); *H01M 4/1391* (2013.01)

(58) Field of Classification Search
CPC   H01M 10/025; H01M 4/13; H01M 2004/021
See application file for complete search history.

(56) References Cited

U.S. PATENT DOCUMENTS

| | | | |
|---|---|---|---|
| 8,530,090 B2 * | 9/2013 | Seshadri et al. | 429/220 |
| 2003/0099884 A1 * | 5/2003 | Chiang et al. | 429/233 |
| 2009/0155678 A1 * | 6/2009 | Less et al. | 429/144 |
| 2010/0323244 A1 * | 12/2010 | Chiang et al. | 429/220 |
| 2011/0143203 A1 * | 6/2011 | Seshadri et al. | 429/220 |
| 2012/0270106 A1 * | 10/2012 | Todorov et al. | 429/223 |
| 2013/0017446 A1 * | 1/2013 | Seshadri et al. | 429/220 |

FOREIGN PATENT DOCUMENTS

| | | | |
|---|---|---|---|
| EP | 2398095 A1 | 12/2011 | |
| WO | WO 2011065408 A1 * | 6/2011 | |

OTHER PUBLICATIONS

Sethuraman et al., Real-Time Stress Measurements in Lithium-ion Battery Negative-electrodes, Journal of Power Sources, 206, 334-342, 2012 (9 pages).
Brouwers, Particle-size distribution and packing fraction of geometric random packings, Physical Review E 74, 031309 (2006) (15 pages).
Colloidal Dynamics, Particle Size Distributions (1999) (4 pages).
Delaney et al., Defining random loose packing for nonspherical grains, Physicalreview E 83, 051305 (2011) (4 pages).
Brouwers, Viscosity of a concentrated suspension of rigid monosized particles, Physical Review E 81, 051402 . (2010) (13 pages).
Brouwers, Packing fraction of geometric random packings of discretely sized particles, Physical Review E 84, 042301 (2011) (3 pages).

(Continued)

*Primary Examiner* — Stewart Fraser
(74) *Attorney, Agent, or Firm* — Brian J. Pangrle

(57) ABSTRACT

A lithium-ion cell can include at least one electrode that includes packed active electrode particles that include a multimodal particle size distribution (PSD) and a packing density, for example, greater than approximately 0.56. Various other apparatuses, systems, methods, etc., are also disclosed.

27 Claims, 10 Drawing Sheets

(56) References Cited

OTHER PUBLICATIONS

Fuji, Active Material for Lithium Ion Battery, LiMn2O4, Fuji LMN Series (2012) (4 pages).

Hofmann et al., Powder Technology, From landslides and concrete to avalanches and chocolate, EPFL, Sep. 26, 2012 (40 pages).

Ganesan et al., Study of cobalt-doped lithium—nickel oxides as cathodes for MCFC, Journal of Power Sources 111 (2002) 109-120 (12 pages).

Henderson et al., the optimum particle-size distribution of coal for coal-water slurries, Am. Chem. Soc., Fuel Chem., 28 (1983) 1-9 (11 pages).

Lee et al., A novel and efficient water-based composite binder for LiCoO2 cathodes in lithium-ion batteries, Journal of Power Sources 173 (2007) 985-989 (2 pages).

Moorthi, Lithium Titanate Based Batteries for High Rate and High Cycle Life Applications (2010) (8 pages).

Horiba Scientific, Particle Size Analysis of Battery Materials (2013) (7 pages).

\* cited by examiner

LITHIUM-ION CELL AND ENERGY DENSITY THEREOF

TECHNICAL FIELD

Subject matter disclosed herein generally relates to lithium-ion cell technology.

BACKGROUND

Electrochemical cells include, for example, lithium-ion cells. Such cells may be characterized, for example, as to specific energy (e.g., Wh/kg or MJ/kg), energy density (Wh/l or MJ/l), specific power (W/kg), etc. Various technologies and techniques described herein pertain to electrochemical cells, for example, including lithium-ion cells.

SUMMARY

A lithium-ion cell can include at least one electrode that includes packed active electrode particles that include a multimodal particle size distribution (PSD) and a packing density, for example, greater than approximately 0.56. Various other apparatuses, systems, methods, etc., are also disclosed.

BRIEF DESCRIPTION OF THE DRAWINGS

Features and advantages of the described implementations can be more readily understood by reference to the following description taken in conjunction with examples of the accompanying drawings.

DETAILED DESCRIPTION

The following description includes the best mode presently contemplated for practicing the described implementations. This description is not to be taken in a limiting sense, but rather is made merely for the purpose of describing general principles of various implementations. The scope of invention should be ascertained with reference to issued claims.

Figure 1:
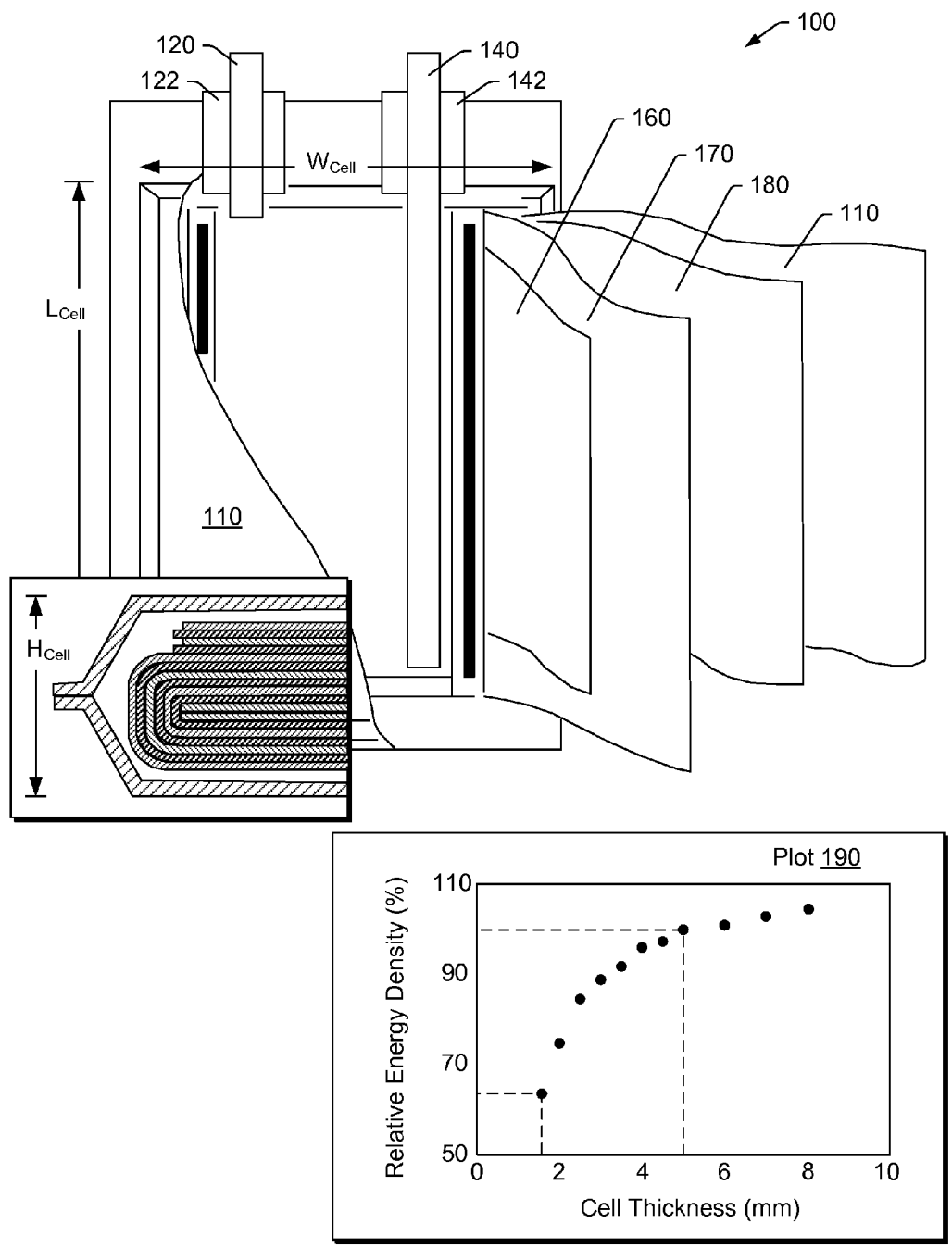
FIG. 1 is a diagram of an example of a battery and an example of a plot of relative energy density versus cell thickness.

FIG. 1 shows an approximate cut-away view of an example of a battery 100 that includes a casing 110, a positive tab 120 and a negative tab 140, for example, to operatively couple the battery 100 to circuitry. The casing 110 may include a cell region defined by a cell length ($L_{cell}$), a cell width ($W_{cell}$) and a cell height ($H_{cell}$). As an example, the cell region may include one or more electrochemical cells. As an example, an electrochemical cell may be formed in part by a cathode 160, a separator 170 and an anode 180. Such components may be "rolled", for example, to form a stack (e.g., "jelly roll") that may be housed in the cell region of the casing 110. As shown in the example of FIG. 1, the height ($H_{cell}$) of the cell region of the casing 110 may be defined in part by thicknesses of the cathode 160, the separator 170 and the anode 180 as well as, for example, by stacking of such components (e.g., winding in a roll or other configuration).

As mentioned, a cell (e.g., or cells) may be characterized, for example, as to specific energy (e.g., Wh/kg or MJ/kg), energy density (Wh/l or MJ/l), specific power (W/kg), etc. As an example, a region of a battery with one or more cells may include $L_{cell}$ and $W_{cell}$ dimensions, for example, with a $L_{cell}/W_{cell}$ ratio in a range of about 1 to about 5. As an example, consider a cell (or cells) with dimensions of about 120 mm ($L_{cell}$) by about 100 mm ($W_{cell}$) where, in combination with a height ($H_{cell}$), a volume ($Vol_{cell}$) may be calculated. As an example, with a volume ($Vol_{cell}$) and energy density (ED in Wh/l), an energy value (e.g., Wh) may be determined for the battery.

FIG. 1 shows an example of a plot 190 that illustrates a relationship between cell thickness (e.g., ~$H_{cell}$) and relative energy density. In the plot 190, a cell thickness of about 5 mm may be used as a standard by which thinner or thicker cell thicknesses may be compared. As indicated in the plot 190, for a cell thickness greater than about 5 mm, the relative energy density may increase; however, for a cell thickness less than about 5 mm, the relative energy density may decrease. For example, for a cell thickness of about 1.8 mm, the relative energy density may be about 65% of the relative energy density for a cell thickness of about 5 mm.

As an example, a battery with a volume of about 43 ml (~43,000 cubic mm) and a thickness ($H_{cell}$) of about 3.6 mm (e.g., with $L_{cell}$ and $W_{cell}$ of about 120 mm and about 100 mm) may have an energy density of about 480 Wh/l. In terms of energy, such a battery may be capable of storing about 21 Wh, which may be sufficient to power 2.6 W circuitry for about 8 hours (e.g., circuitry operational time). In such an example, where the circuitry and battery are housed in a housing (e.g., a device housing), the thickness of the housing may be expected to be greater than about 3.6 mm. As an example, consider an effort to make the same device with a battery having a thickness ($H_{cell}$) of about 2 mm. In such an example, the energy density of the battery may be considerably less (see, e.g., the plot 190), which would result in less operational time, for example, perhaps about 6 hours versus about 8 hours (e.g., considering that the battery volume may be maintained).

Figure 2:
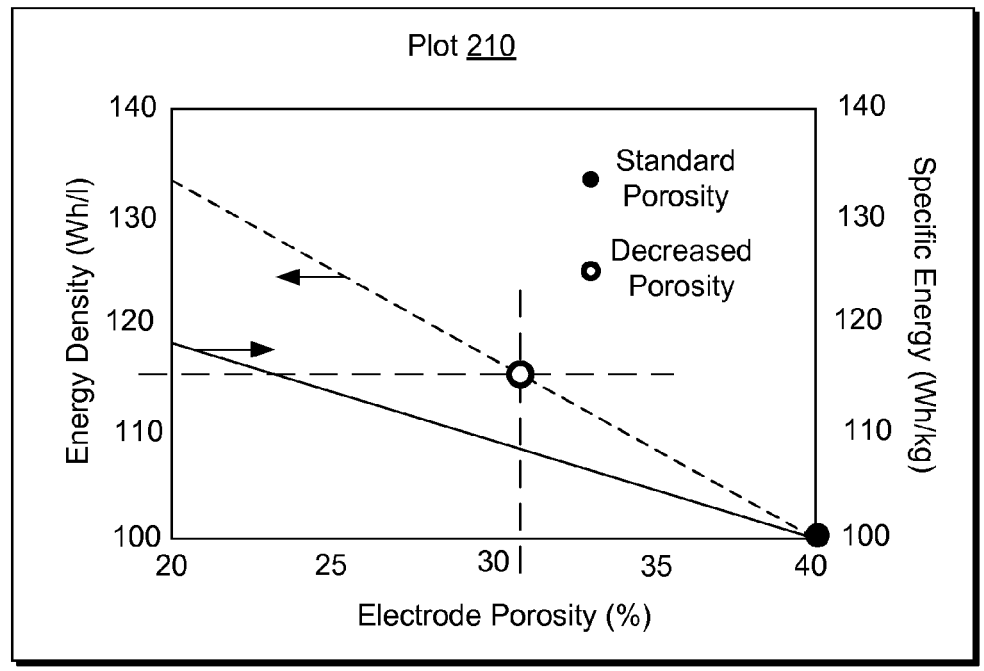
FIG. 2 is a diagram of examples of plots related to energy.
Figure 2:
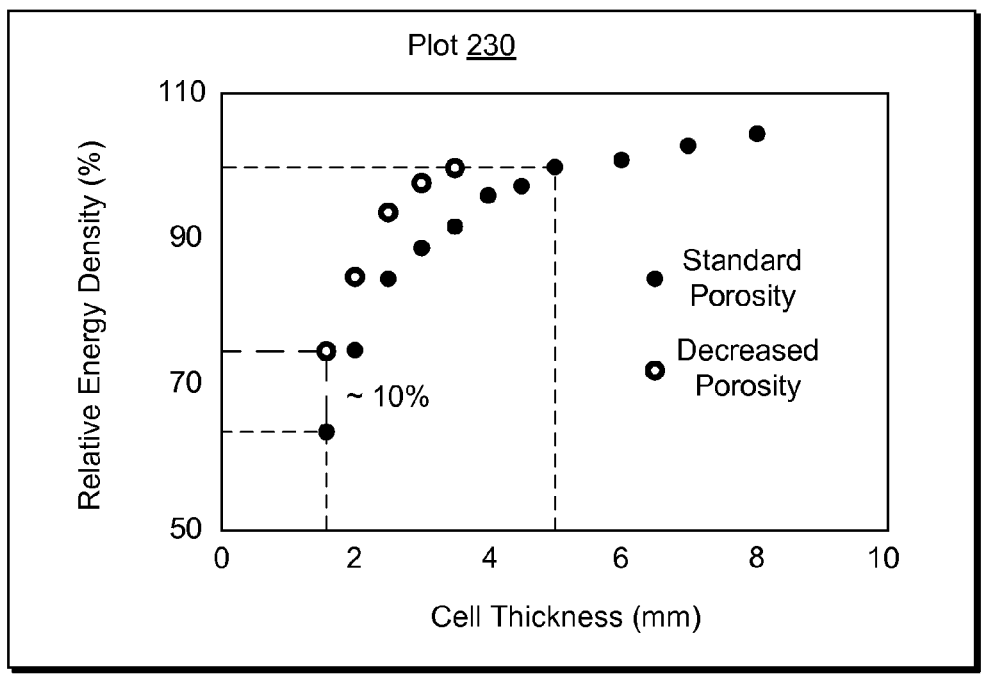

FIG. 2 shows example plots 210 and 230. The plot 210 shows relationships between energy density (ED, as a dashed line) and specific energy (SE, as a solid line) and electrode porosity (EP, as a percentage). As indicated in the plot 210, energy density (ED) may possibly be increased by decreasing electrode porosity (EP). For example, in comparing an electrode porosity (EP) of 40% to an electrode porosity (EP) of about 30%, the energy density (ED) may be about 15% higher for the electrode porosity (EP) of about 30%. The plot 230 shows that a decrease in electrode porosity (EP) may help to offset the impact of a decrease in cell thickness (see also the plot 190 of FIG. 1). For example, by decreasing electrode porosity (EP), the relative energy density (ED) may be increased by about 10% (e.g., or more).

Figure 3:
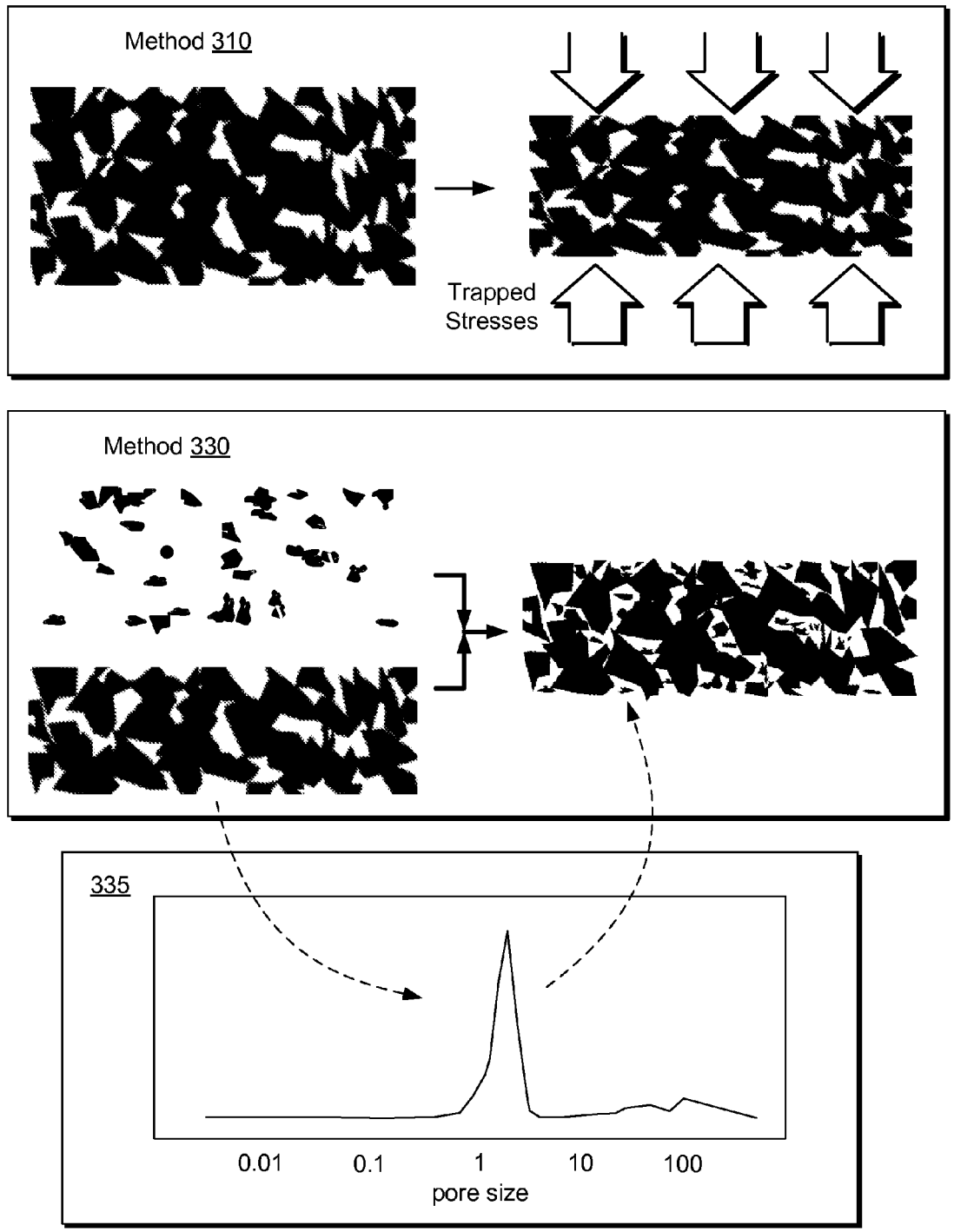
FIG. 3 is a diagram of examples of methods and an example of a plot of pore size distribution.

FIG. 3 shows an example method 310 that includes compacting (e.g., compaction) and an example method 330 that includes providing particles with a multimodal particle size distribution (PSD). For example, the method 310 can include providing an electrode and compacting the electrode, which may decrease the height of the electrode and trap stresses within the electrode. As to the method 330, it can include providing particles of different particle size distributions, for example, where a first population of particles has a particle size distribution (PSD) with a first mean particle size (e.g., or median particle size) and a second population of particles has a particle size distribution (PSD) with a second mean particle size (e.g., or median particle size). The method 330 can include combining the two populations of particles to produce an electrode with particles that exhibit a multimodal particle size distribution (PSD). As an example, the first population and the second population may be provided as a first slurry and a second slurry that may be mixed to form a mixture. In such an example, at least a portion of the mixture may be distributed on a surface, for example, to form an electrode with particles therein that have a multimodal particle size distribution (PSD). As an example, a multimodal distribution may be a continuous distribution with two or more modes or a discontinuous distribution with two or more modes, for example, depending on characteristics of each population that gives rise to a mode.

As an example, a population of particles with a monomodal PSD (e.g., a unimodal PSD) may pack in a manner that results in a pore size distribution with a predominant range of pore size (e.g., a predominant pore size peak). FIG. 3 shows an approximate plot 335 of incremental intrusion of mercury into pores of an electrode that includes $LiNi_{0.8}Co_{0.2}O_2$, as described by Ganesan et al., "Study of cobalt-doped lithium-nickel oxides as cathodes for MCFC [molten carbonate fuel cell]", Journal of Power Sources 111 (2002) 109-120, which is incorporated by reference herein. The plot 335 shows pore size data for particles that were ground and sieved "to obtain uniform particles of size 3-5 µm". A slurry was prepared with the particles using xylene and ball mixing to break weak agglomerates. Binder (polyvinyl butyral) and plasticizer were added with additional ball mixing. The slurry was cast over a glass plate to form a "tape", which was stripped from the glass plate after drying and then sintered to form a sintered $LiNi_{0.8}Co_{0.2}O_2$ cathode. As shown in the plot 335, a majority of pores of the cathode correspond to sizes of about 2 microns to about 3 microns and that porosity was about 38 percent (e.g., void fraction).

As to the method 330, a pore size may be determined or provided for a first population of particles, for example, to determine one or more characteristics of a second population of particles. In such an example, a mixture may be formed by mixing slurries of the two populations of particles and then depositing the mixture onto a surface to form an electrode. As an example, the two populations of particles may have peak frequency particle sizes where a ratio of those sizes (e.g., larger to smaller) is greater than about 1.6 (e.g., and optionally greater than about 7).

As an example, a method may include accessing a multimodal packing model, for example, to estimate one or more characteristics of an electrode, one or more characteristics of material to form an electrode, etc.

Figure 4:
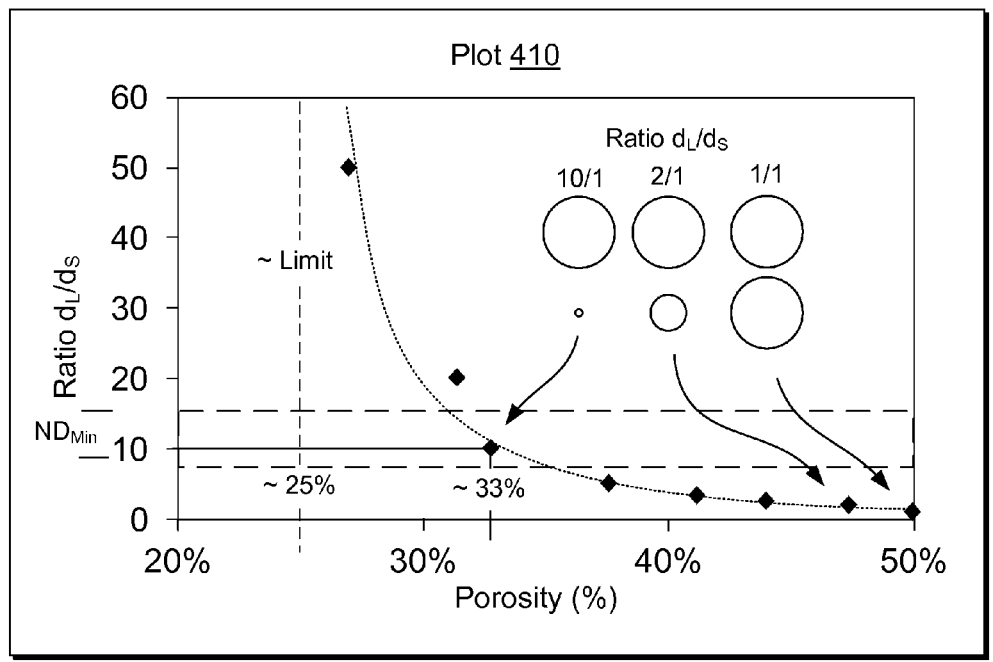
FIG. 4 is a diagram of examples of plots of packing characteristics.
Figure 4:
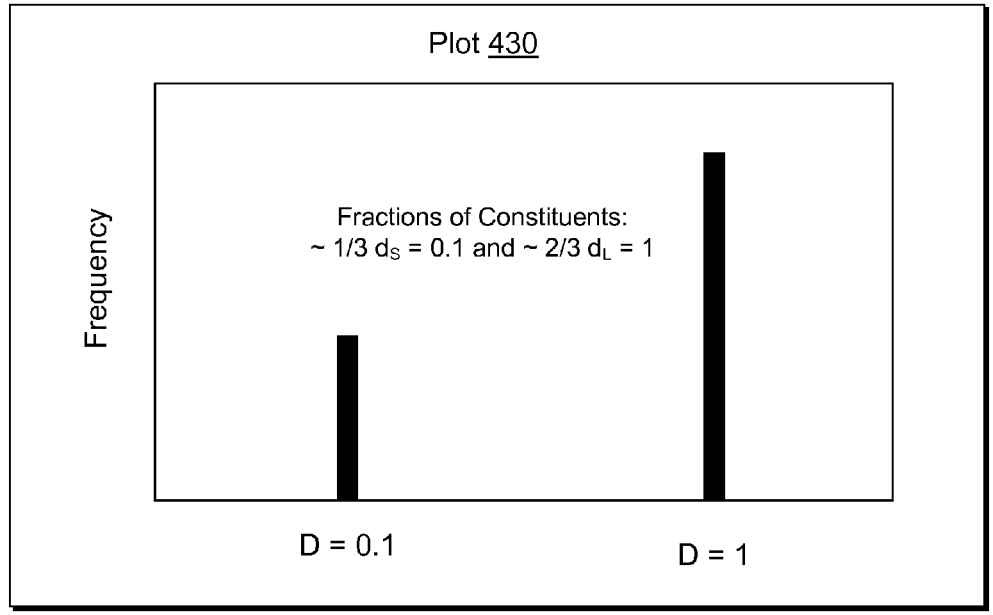

As an example, a multimodal packing model may be based in part on one or more of theory, a numerical technique, data, etc. FIG. 4 shows an example of a plot 410 for a multimodal packing model. As shown, an approximate relationship may exist between a ratio of larger diameter spheres to smaller diameter spheres and porosity. As indicated in the plot 410, as the ratio increases, the porosity decreases, for example, approaching an asymptotic limit of about 25 percent porosity. At the other end of the plot 410, where the ratio is approximately unity (e.g., monomodal), porosity may be about 50 percent.

In the example of FIG. 4, the plot 410 also shows a region for a ratio of about 7 to about 16, which may correspond to a minimum ratio for so-called nondisturbed packing of a population of larger diameter spheres and a population of smaller diameter spheres (e.g., particles with a multimodal particle size distribution). Nondisturbed may mean that the population of smaller diameter spheres may be distributed in interstices of larger diameter spheres without substantially altering (e.g., without theoretically altering) the packing of the larger diameter spheres (e.g., packing of the larger diameter spheres remains constant in the presence or absence of the smaller diameter spheres, within population volumetric constraints).

FIG. 4 also shows a plot 430 for two populations of particles with a ratio of about 10 where the fraction of constituents of the population of smaller particles is about one-third and the fraction of constituents of the population of larger particles is about two-thirds. As an example, a mixture of particles may be considered a saturated mixture where, for example, sufficient small particles are added to just "fill" (pack into) the void fraction between the large particles. As an example, oversaturation may infer that the number of small particles and their respective packing volume exceeds the pore volume of interstices of packed larger particles, which may result in disturbed packing.

An article entitled "Particle-size distribution and packing fraction of geometric random packings", by H. J. H. Brouwers, Physical Review E, 74, 0031309 (2006), is incorporated by reference herein. The plot 410 includes values from Table I of Brouwers (e.g., mixing conditions for maximum bimodal packing fraction of spheres). Such values are derived from binary mixtures of particles as loosely packed spheres.

As an example, a model may consider multimodal packing where multimodal may be greater than bimodal. For example, consider voids of larger particles packed with smaller particles, whose voids in turn are filled with even smaller particles, etc. (e.g., a form of geometrical progression). As an example, a population of particles with a progressive PSD may be separated into populations or, for example, separate populations of particles may be combined to form a progressive PSD (e.g., optionally a continuous PSD such as a power law PSD).

As an example, one or more of the equations of Brouwers may be included in a model where the model may be used in a method for forming an electrode, outputting specifications for forming an electrode, etc. As an example, an input to a model may be an energy density and an output may be particle information (e.g., particle size, particle distribution shape, particle shape, particle population mixing order, etc.).

As an example, a packing of particles may be characterized as a disordered packing. Examples of packings may include those of rice grains, cement, sand, medical powders, ceramic powders, fibers, and atoms in amorphous materials, which may tend to have a mono-sized packing fraction that depends on a method of packing. As an example, a so-called random loose packing (RLP) may have, for uniform spheres, a packing fraction in the limit of zero gravity of about 0.44 (e.g., void fraction of about 0.56); whereas, a so-called random close packing (RCP) may have, for uniform spheres, a packing fraction of about 0.64 (e.g., void fraction of about 0.36). RCP may be considered by some to be mathematically ill-defined and rather referred to as, for example, "maximally random jammed". As to RLP, it may be considered by some to be very loose random packing, for example, as achieved by spheres slowly settling.

An article entitled "Defining random loose packing for nonspherical grains", by G. W. Delaney et al., Physical Review E, 83, 051305 (2011), is incorporated by reference herein. The aforementioned article describes viscosity, for example, noting that as the viscosity is increased, packing fraction progressively declines until curves converge to a sedimented loose packing limit. The article notes that a larger degree of grain motion may occur at low viscosity, which may lead to numerous collisions between grains before they have dissipated their energy and come to rest; whereas, as viscosity is increased, the deposition of the grains becomes closer to sequential deposition onto an already packed bed where each grain may be relatively unencumbered by interactions with other grains that are depositing onto a packing surface. The article by Delaney et al. also mentions relationships between so-called high-friction grains and viscosity. As an example, a model may be provided that includes a parameter that may account for particle friction (e.g., friction between particles where such particles may have a multimodal particle size distribution). Such a model may be based, for example, on theory, data, numerical techniques, etc. As an example, a model may receive as an input an energy density and, in turn, output information as to particle characteristics, viscosity, etc. for fabrication of an electrode that may achieve the input energy density.

As an example, particles may be mixed with one or more other materials to form a slurry. A slurry may be defined as a mixture of a liquid and solid particles that retain some fluidity. As an example, viscosity of a slurry may be described as relative to the viscosity of a liquid phase. As an example, a population of particles may be provided in a liquid phase as a slurry. As an example, populations of particles may be provided in liquid phase as slurries, for example, one slurry per population of particles.

As an example, active electrode particles may be for a cathode. For example, consider particles that include one or more of lithium cobalt oxide ($LiCoO_2$), lithium nickel oxide ($LiNiO_2$), lithium manganese oxide ($LiMn_2O_4$), and lithium iron phosphate ($LiFePO_4$).

As an example, positive active electrode particles may include lithium and metal oxide, for example, represented by $Li_xM^1_yM^2_{1-y}O_2$ where $0.4 \leq x \leq 1$; $0.3 \leq y \leq 1$; $M^1$ is at least one selected from the group consisting of Ni and Mn; and $M^2$ is at least one selected from the group consisting of Co, Al, and Fe. As an example, positive active electrode particles may include lithium and metal oxide, for example, be represented by one of the following: $LiNi_xCo_yAl_zO_2$, where $0.7 \leq x \leq 1$; $0 \leq y \leq 0.3$; $0 \leq z \leq 0.03$; and $0.9 \leq x+y+z \leq 1.1$; $LiNi_xCo_yMn_zO_2$, where $0.3 \leq x \leq 0.6$; $0 \leq y \leq 0.4$; $0.3 \leq z \leq 0.6$; and $0.9 \leq x+y+z \leq 1.1$; $Li_xMn_zO_2$, where $0.4 \leq x \leq 0.6$; and $0.9 \leq z \leq 1$; or $LiFe_xCo_yMn_zO_2$, where $0.3 \leq x \leq 0.6$; $0.1 \leq y \leq 0.4$; $0.3 \leq z \leq 0.6$; and $0.9 \leq x+y+z \leq 1.1$ As an example, active electrode particles may be for an anode. For example, consider particles that include one or more of carbon lithium and lithium titanate. As to lithium titanate, consider, for example: $Li_2TiO_3$; $Li_4TiO_{12}$; $Li_4Ti_5O_{12}$.

As an example, a PSD may be approximately Gaussian. As an example, a PSD may be characterized by a median particle size and/or a mean particle size and/or a highest frequency particle size. As an example, consider active electrode particles with a median particle size of about 10 microns and an approximately Gaussian PSD spanning from about 3 microns to about 30 microns where, for example, about 80 percent of the particles may be in a range from about 8 microns to about 12 microns. As an example, a particle size analyzer may be employed to measure particle sizes. For example, consider a HORIBA Scientific LA-950 laser diffraction particle size analyzer (HORIBA, Ltd., Kyoto, Japan).

As an example, a method may include measuring particle sizes. As an example, a method may include selecting particle sizes. As an example, a method may include providing populations of particles with different particle sizes. As an example, a method may include providing populations of particles with different PSDs.

As an example, an electrode may include electrolyte. For example, consider an electrolyte that includes $Li(ClO4)_2$ in polycarbonate/tetrahydrofuran (PC/THF) (e.g., about 0.4 M).

As an example, an electrode may be formed from a slurry that includes active electrode particles (e.g., a solid phase) in a liquid phase. As an example, to fabricate a positive electrode, for example, a slurry may be prepared by dispersing a positive electrode active material in a solvent followed by applying the slurry to a surface (e.g., a positive electrode current collector) and, for example, removing the solvent by drying.

As an example, a fluid phase in a slurry may include one or more solvents. As an example, a solvent may be xylene, dimethyl formamide (DMF), dimethyl acetamide (DMAc), tetramethyl urea, dimethyl sulfoxide (DMSO), triethyl phosphate (TEP), N-methyl-2-pyrrolidone (NMP), acetone, tetrahydrofuran (THF), methyl ethyl ketone (MEK), methyl isobutyl ketone (MIBK), a glycol ether, n-butyl acetate, cyclohexanone, and water.

As an example, a slurry may include $LiMn_2O_4$ (e.g., in a range from about 18 percent to about 25 percent by weight), conductive carbon (e.g., in a range from about 0.8 percent to about 3 percent by weight), additive(s) (e.g., in a range from about 0.8 percent to about 3 percent by weight), water and/or organic solvent (e.g., in a range from about 70 percent to about 80 percent). In such an example, the slurry may include particles, for example, in one or more populations, that include particle sizes of $LiMn_2O_4$ of about 60 nm to about 300 nm, that include particles of conductive carbon from about 0.1 micron to about 1.8 micron, etc. As an example, a slurry may have a viscosity in a range of about 2500 cP (mPas) to about 7500 cP (mPas) at about 25 degrees C. As an example, consider that water has a viscosity of about 1 cP at about 20 degrees C. and that honey may have a viscosity of about 2000 cP to about 10000 cP.

As an example, an additive may be carboxy methyl cellulose (CMC) and/or polyvinyldifluoride (PVDF) for modifying viscosity and/or styrene butadiene rubber (SBR) as an adhesion resin.

As an example, active electrode particles may be provided in one or more populations where, for example, each population includes a median or a mean particle size in a range from about 0.015 microns (15 nm) to about 15 microns. As an example, a ratio of median or mean particle size (e.g., or maximum frequency size) of a first population to a median or mean particle size (e.g., or maximum frequency size) of a second population may range from about 3 to about 1000. As an example, a mixture of two populations may be characterized by a bimodal PSD where the ratio of a median or mean particle size (e.g., or maximum frequency size) of one population (e.g., one mode) to the median or mean particle size (e.g., or maximum frequency size) for the other population (e.g., another mode) is greater than about 5, which may provide (e.g., theoretically) for nondisturbing packing.

Figure 5:
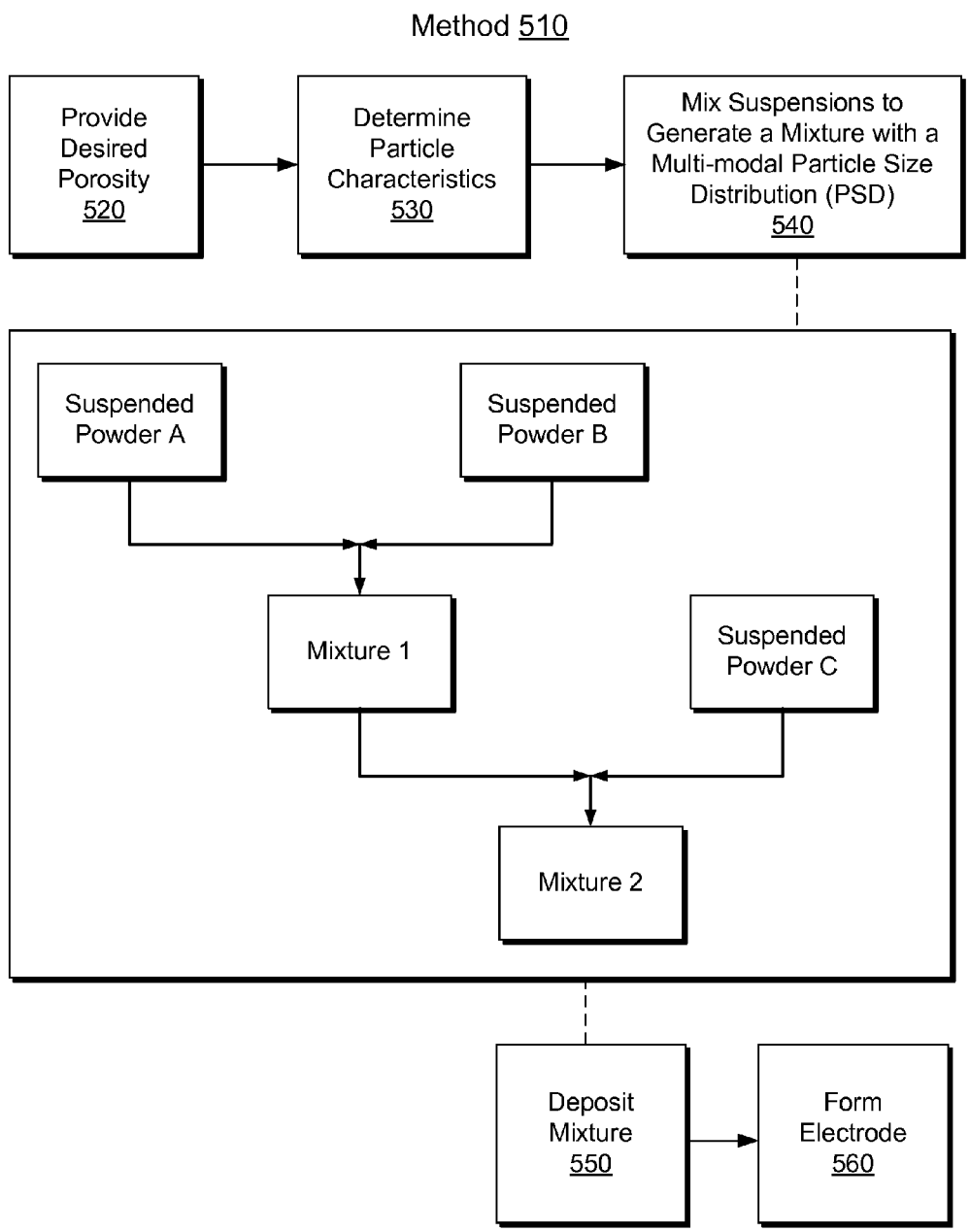
FIG. 5 is a diagram of an example of a method.

FIG. 5 shows an example of a method 510 that includes a provision block 520 for providing a desired porosity of an electrode (e.g., optionally associated with a target energy density), a determination block 530 for determining particle characteristics based at least in part on the desired porosity, a mix block 540 for mixing suspensions (e.g., slurries) to generate a mixture with a multimodal PSD, a deposit block 550 for depositing the mixture and a formation block 560 for forming an electrode based on the deposited mixture. As an example, a method may include a provision block for providing a desired energy density or target energy density, for example, where a determination block may allow for determining particle characteristics based at least in part on the desired energy density.

As shown in FIG. 5, a suspended powder A and a suspended powder B may be mixed to form a mixture 1, which may be mixed with a suspended powder C to form a mixture 2. As an example, the mixture 2 may be deposited onto a surface, for example, per the deposit block 550. While three suspensions (e.g., slurries) are shown, as an example, two or more than three suspensions may be used, for example, to ultimately provide a mixture for deposition onto a surface.

As an example, a method may include scanning a powder, packing the powder and mapping pore distribution in the packed powder, selecting one or more populations of particles for "pore filling" and making an electrode using the powder and the one or more populations of particles. In such an example, the electrode may be constructed without increasing volume or electrode thickness compared to that of an electrode constructed from the packed powder without the one or more populations of particles. As an example, the powder and the one or more populations of particles may be active electrode material, which may be the same material or different material (e.g., yet compatible materials). As an example, a method may be multi-stage, for example, to achieve a desired packing structure. As an example, a method may be flexible in that it allows for selection of porosity to achieve a desired ED (e.g., optionally without affecting volume).

As an example, a method may include providing a main powder in a fluid phase and providing a suspended powder with a specific particle size characteristic that matches a largest pore size of a structure that would result from packing of the main powder (e.g., a RLP). Such a method may include forming a slurry by mixing the main powder in the fluid phase with the suspended powder to form a mixture. As an example, the suspended powder may be powder suspended in a solvent (e.g., xylene), for example, without binder.

As an example, a method may include vibrating a slurry, a mixture, and/or a substrate (e.g., a surface) onto which a mixture is deposited. As an example, a method may include using mixing and spot vibration (e.g., alternated—short duration) during a slurry mixing process.

As an example, a desired particle size distribution (e.g., population of particles) may be suspended in a solvent (e.g., xylene) to form a slurry, for example, without binder. In such an example, one or more additions may be performed from larger particle population(s) to a smallest particle population, for example, to achieve a desired porosity.

As an example, a method may include providing a main powder with a solvent as a slurry, providing another powder with a solvent as a slurry, mixing the two slurries and adding binder to form a mixture where the mixture may be, for example, deposited onto a surface to form an electrode. In such an example, the main powder and the other powder may include active electrode particles where, together, the particles have a multimodal PSD (e.g., a bimodal PSD, etc.). As an example, three or more slurries may be mixed to form a mixture, for example, where the slurries include active electrode particles that, together, have a multimodal PSD (e.g., a trimodal PSD, etc.).

Figure 6:
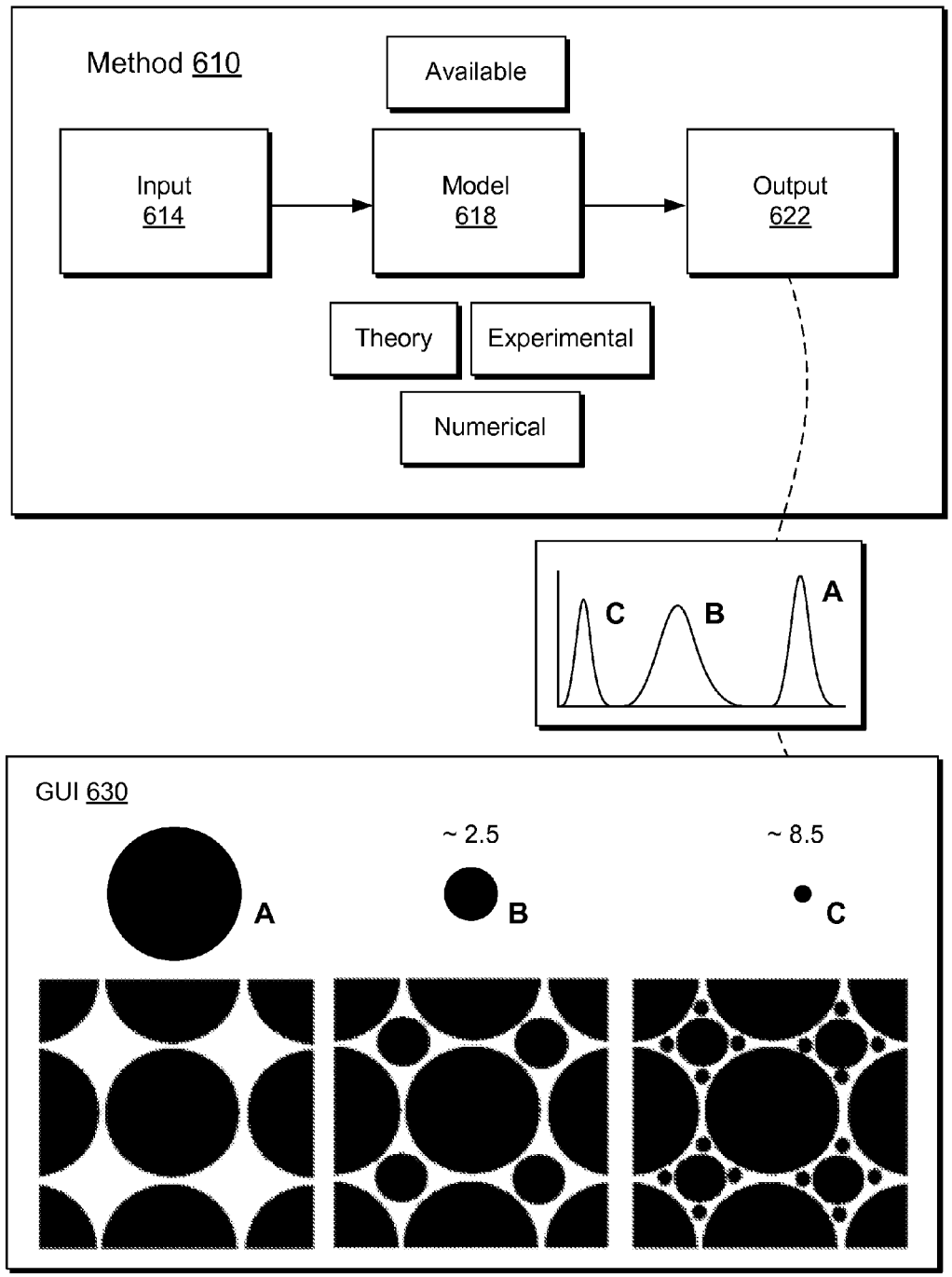
FIG. 6 is a diagram of an example of a method.

FIG. 6 shows an example of a method 610 that includes an input block 614, a model block 618 and an output block 622. As an example, the model block 618 may include a theoretical module, a numerical module and/or an experimental module that may, for example, operate on input information from the input block 614 to generate output information for output by the output block 622. As an example, a model may include information as to one or more available populations of particles. As an example, the output block 622 may output characteristics for at least two populations of particles. For example, consider three populations of particles, labeled A, B and C in the example of FIG. 6. As an example, the method 610 may include rendering a graphical user interface (GUI) 630 to a display that may show information about populations of particles. For example, the GUI 630 shows approximations of packing of particles of populations A, B and C (e.g., that can achieve a desired porosity). While the particle populations A, B and C appear as uniform spheres, such populations may be characterized by distributions, for example, where the sizes shown represent a median size, a mean size, a maximum frequency size, etc. (e.g., which may be used, at least in part, to estimate packing density, etc.).

Figure 7:
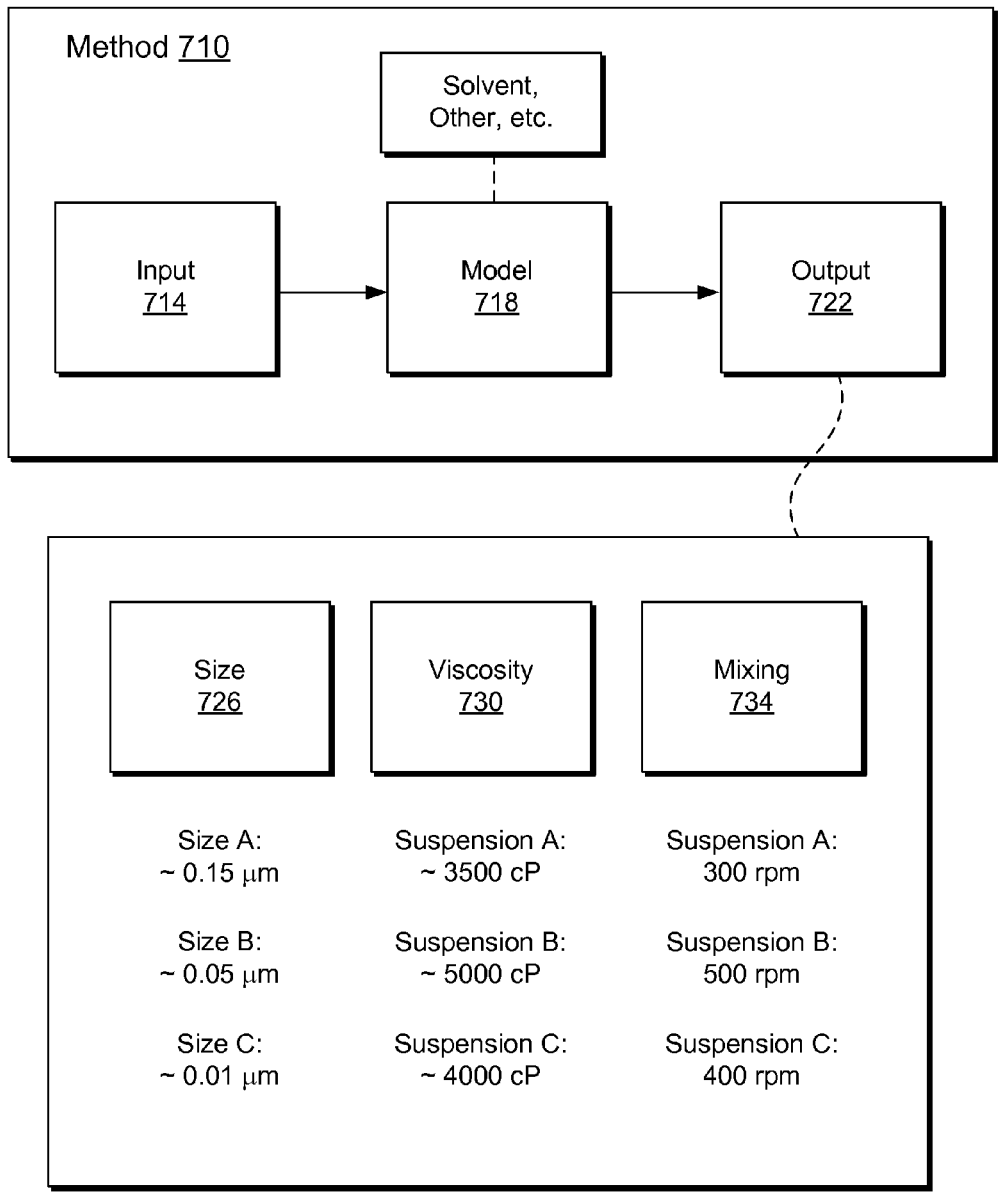
FIG. 7 is a diagram of an example of a method.

FIG. 7 shows an example of a method 710 that includes an input block 714, a model block 718 and an output block 722. As an example, the model block 718 may include one or more features of the model block 618 of the method 610. In the example of FIG. 7, the model block 718 may include a module that can account for solvent characteristics, for example, for estimating a viscosity of a slurry or viscosities of slurries. As an example, the output block 722 may output information such as size information 726, viscosity information 730 and mixing information 734 (e.g., type of mixing, energy of mixing, mixing speed, order of mixing, etc.).

As an example, an electrode may be part of an electrochemical cell that may be part of a battery such as, for example, the battery 100 of FIG. 1.

Figure 8:
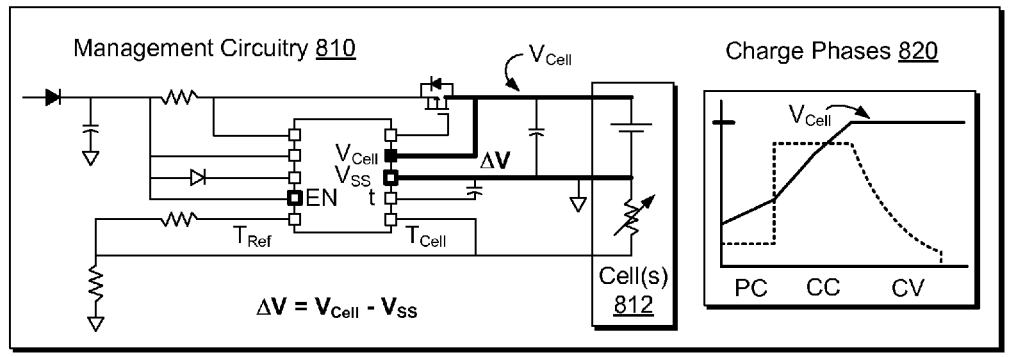
FIG. 8 is a diagram of an example of circuitry and an example of a method.
Figure 8:
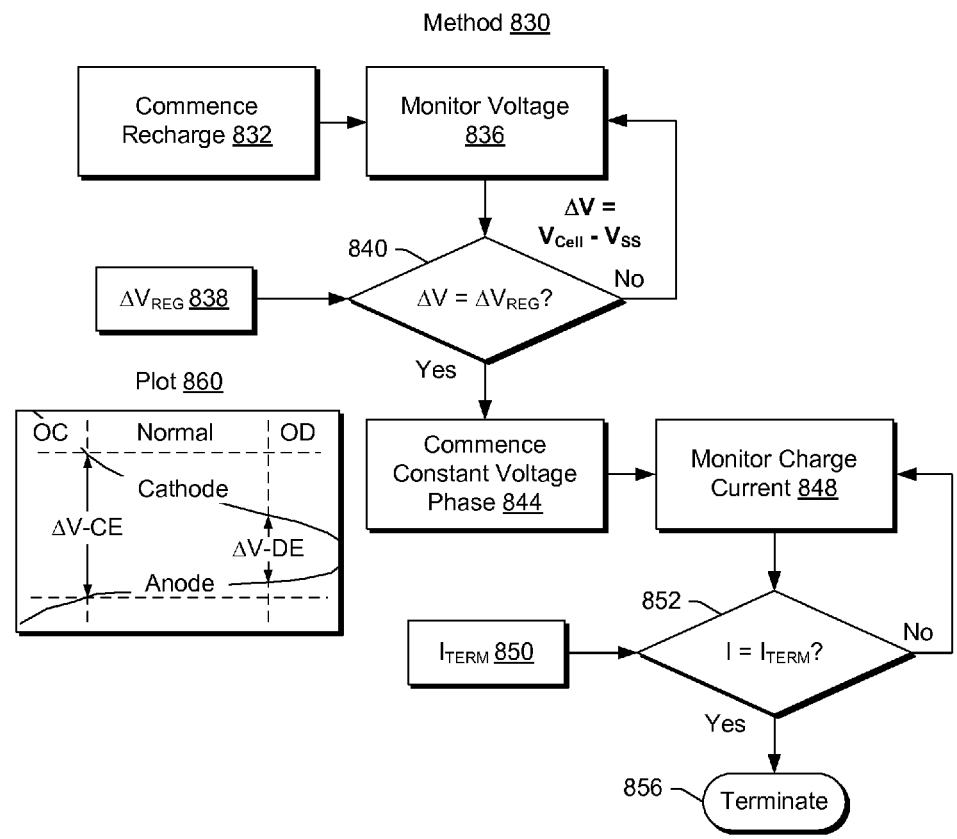

FIG. 8 shows an example of management circuitry 810 for managing charging of one or more electrochemical cells 812, an example charge phase plot 820, an example of a method 830 and an example potential plot 860.

As shown in FIG. 8, management circuitry 810 includes an integrated circuit with 10 pins. The pins may include charge current sense input, battery management input supply, charge status output, logic enable, cell temperature sensor bias, cell temperature sensor input, timer set, cell management 0 V reference, cell voltage sense, and drive output. As to protection features, a cell temperature sensor bias feature may provide for a voltage reference to bias an external thermistor for continuous cell temperature monitoring and prequalification while a cell temperature sensor input feature may provide for input for an external thermistor for continuous cell temperature monitoring and prequalification (optionally may be disabled by applying a set voltage) and safety timers (e.g., preconditioning, fast charge, elapsed time termination, etc.) that may be scaled by a capacitor. A temperature-sensing circuit may have its own reference such that it is immune to fluctuations in the supply voltage input (e.g., where the temperature-sensing circuit is removed from the system when no supply is applied, eliminating additional discharge of cell(s)).

As to logic, a logic enable feature may provide for input that, for example, forces charge termination, initiates charge, clears faults or disables automatic recharge. For example, a logic-enable input pin (EN) may provide for features to terminate a charge anytime during the charge cycle, initiate a charge cycle or initiate a recharge cycle. A logic input (e.g., high or low) may signal termination of a charge cycle.

Also shown in FIG. 8 is an example of a charge phase plot 820 that indicates, as an example, how charging may include a preconditioning phase (PC), a constant current phase (CC) and a constant voltage (CV) phase.

A cell voltage sense function (e.g., implemented in part via the pin labeled "$V_{cell}$") can provide for monitoring voltage at, for example, a positive terminal of a cell (e.g., for single, dual, etc., series cell packs with coke or graphite anodes) with respect to a reference that is based on the negative terminal of a cell (see, e.g., the pin labeled $V_{SS}$). Thus, the management circuitry 810 can measure voltage (e.g., $\Delta V$) as a difference between a cathode potential ($V_{cathode}$, as applied at the pin $V_{cell}$) and an anode potential ($V_{anode}$, as applied at the pin $V_{SS}$). As explained with respect to the method 830, a specified voltage ($\Delta V_{REG}$) may be a limit for $\Delta V$. In the example of FIG. 8, the management circuitry 810 and the method 830 do not include a mechanism for adjusting $\Delta V_{REG}$ or adjusting measurements of $V_{cell}$ or $\Delta V$ if the anode potential ($V_{anode}$) as applied to the pin $V_{SS}$ should change. For example, if the anode potential ($V_{anode}$) applied to the pin $V_{SS}$ increases then the cathode potential ($V_{cathode}$) applied to the pin $V_{cell}$ required to commence the constant voltage (CV) phase may be increased as well, possibly to a potential that exceeds an upper limit for the cathode.

Management circuitry may be configured to manage, to varying extent, state-of-charge (SOC) mismatch and capacity/energy (C/E); noting that as the number of cells and load currents increase, the potential for mismatch also increases. Though SOC may be more common, each type of mismatch problem may limit capacity (mA·h) of a pack of cells to capacity of the weakest cell.

In the example of FIG. 8, the cell(s) 812 may include a polymer composite material such as polyethylene oxide or polyacrylonitrile that includes lithium salt. Such a cell or cells may be referred to as a lithium-ion battery or a lithium-ion polymer battery or a lithium-polymer battery (e.g., "LiPo battery" or "LiPo cell"). LiPo cells are sometimes referred to as laminate cells, which may be configured very thin or quite large depending on their intended use. One or more LiPo cells may be encased in a flexible aluminum foil laminate pouch (e.g., with a thickness on the order of about 0.1 mm). LiPo cells may include a stacked construction formed by stacking electrode and electrolyte materials in a flat sandwich (e.g., defined by length, width and height dimensions). Stacked layers may be packed in a package (see, e.g., FIG. 1) in a flat, rolled or other configuration. LiPo cell capacities can include capacities in a range, for example of about 50 mA·hrs (e.g., for a small cell such as for a Bluetooth headset) to about 10 A·hrs or more for an electric vehicle (e.g., electric or hybrid).

As to function of a lithium-ion cell, lithium ions move from a negative electrode to a positive electrode during discharge and reversely when being charged. As an example, a LiPo cell can include a polyethylene (PE), a polypropylene (PP), a PP/PE, or other material as a separator. Some LiPo cells include a polymer gel containing an electrolyte solution, which is coated onto an electrode surface.

For lithium-ion cells, when cell voltage drops to a low value (e.g., about 1.5 V), reactions at an anode can produce gas (e.g., over-discharge or "OD"). If voltage continues to drop (e.g., under about 1 V), copper of a copper-based anode current collector can start to dissolve and may short out a cell. When cell voltage increases to a high value (e.g., about 4.6V), gassing may occur at a cathode as electrolyte may start to decompose (e.g., overcharge or "OC"). As an example, a lithium-ion cell or cells may be connected to an external thermal fuse for overcharge protection (e.g., in addition to the control by management circuitry). As to the potential plot 860, it shows a normal operating range that exists between a charge end voltage ($\Delta V$-CE) and a discharge end voltage ($\Delta V$-DE). In the example of FIG. 8, the normal range lies between an overcharge region (OC) and an over-discharge region (OD). As mentioned, damage can occur in either of these regions.

As to the example method 830 of FIG. 8, it pertains to recharging one or more lithium-ion cells such as the cell(s) 812, for example, using circuitry such as the management circuitry 810 and achieving charge phases such as those of the charge phase plot 820.

As shown in FIG. 8, the method 830 commences in a commencement block 832 for commencing a recharge of one or more cells. The commencement block 832 can initiate a preconditioning (PC) phase and, thereafter, a constant current (CC) phase. A monitor block 836 follows for monitoring voltage of the one or more cells during a constant current (CC) phase. A decision block 840 relies on monitoring of the voltage for comparison to a specified voltage ($\Delta V_{REG}$). The decision block 840 provides for deciding when the recharge process should terminate the constant current (CC) phase and commence a constant voltage (CV) phase.

The decision block 840 may receive a value for the specified voltage ($\Delta V_{REG}$) from one or more storage registers 838 for storing one or more values for the specified voltage ($\Delta V_{REG}$). In the example of FIG. 8, the one or more storage registers 838 may store a value such as 4.1 V, 4.2 V, 8.2 V, 8.4 V, etc. (e.g., as one or more preset voltage regulation options). The value or values stored in the one or more storage registers 838 may depend on characteristics of a cell or cells or number of cells (e.g., where n=2, n*4.1 V provides a value of 8.2 V). In the example of FIG. 8, the specified value ($\Delta V_{REG}$) may be based on the maximum voltage that a particular lithium-ion cell (or cells) can reach during charging as to prevent overcharge side reactions at a positive electrode and material phase changes in a positive electrode. As some examples, consider a $LiCoO_2$ cathode material with a maximum operational potential of about 4.2 V and a $LiMnO_4$ cathode material with a maximum operational potential of about 4.3 V.

In the example of FIG. 8, the management circuitry 810 may reference inputs and outputs with respect to a management circuit reference potential ($V_{SS}$) that may be intended to be a 0 V reference potential. In the circuitry 810, one of the pins, labeled $V_{SS}$, is electrically connected to the "negative" electrode of the cell(s) 812. Specifically, it is electrically connected with the anode(s) of the cell(s) 812. Accordingly, in the method 830, the voltage monitored by the monitoring block 836 (e.g., at the pin labeled $V_{cell}$) is measured with respect to the negative electrode (i.e., anode(s)) of the cell(s) 812 (e.g., applied to the pin labeled $V_{SS}$). Such an approach relies on an assumption that the negative electrode (i.e., anode(s)) of the cell(s) 812 (e.g., $V_{SS}$) has a potential of approximately 0 V and remains at approximately 0 V. Under such an assumption, the condition of the decision block 840 may be met when $V_{cell}$-$V_{SS}$=$\Delta V_{REG}$. However, should changes occur to the cell(s) 812, the potential of the anode may not remain constant. For example, if the potential of the anode increases, then the potential at the pin labeled $V_{SS}$ of the management circuitry 810 will increase as well. Under such conditions, to meet the criterion specified by $\Delta V_{REG}$, the potential of the cathode must be higher as applied to the pin labeled $V_{cell}$ of the management circuitry 810. Depending on the amount of increase in potential of the anode, the potential of the cathode may exceed a recommended upper limit for the cathode.

As shown in the example of FIG. 8, the method 830 continues to the commencement block 844 for commencing a constant voltage (CV) phase when the decision block 840 decides that the monitored voltage (e.g., $\Delta V$=$V_{cell}$-$V_{SS}$) is equal to the specified voltage (e.g., $\Delta V_{REG}$).

For the constant voltage (CV) phase, the method 830 continues in a monitor block 848 for monitoring charge current, which may decline with respect to time as shown in the charge phase plot 820. As shown, another decision block 852 provides for deciding when the constant voltage (CV) phase should terminate. For example, a storage register 850 may store a value for a termination current $I_{TERM}$. In such an example, the decision block 852 may receive the $I_{TERM}$ value from the storage register 850 and compare it to a monitored current value from the monitor block 848. As the monitored current diminishes during the constant voltage (CV) phase, it eventually reaches the $I_{TERM}$ value, upon which the method 830 terminates in a termination block 156 (e.g., to terminate the recharge process commenced at block 832).

Electrochemical cell cycling can alter stress within a cell (e.g., stress, strain, etc.). As an example, a cathode may liberate elemental lithium and form a metal oxide composed of a partner metal such as, for example, cobalt (e.g., to form cobalt oxide). The undesired metal oxide may stress the cathode and result in damage. Material in an electrode may be susceptible to swelling, for example, binder or additives may exhibit swelling that can alter stress within a cell.

As mentioned, the method 310 of FIG. 3 may include compacting, which may impart residual or "trapped" stresses in an electrode. During cycling, temperature variations, etc., stresses associated with compaction may be released, which may act to damage an electrodes structure. In other words, compaction may accelerate damage caused by stresses that result from cycling and/or temperature variations. As an example, a method such as the method 330 of FIG. 3 may form an electrode without compacting that has less residual stress. For example, an electrode may be formed using gravity settling and optionally vibration, rather than compaction. As an example, where a method includes compacting of particles that have a multimodal PSD, such compacting may impart less residual stress when compared to compacting of particles with a monomodal PSD. For example, the particles with a multimodal PSD may be packed with lesser porosity, be capable of more rearrangements (e.g., due to different size particles and ratios thereof), etc., when compared to a particles with a monomodal PSD. As an example, an electrode formed with particles with a multimodal PSD may have a lesser porosity and lesser residual stress than an electrode formed with particles with a monomodal PSD that have been mechanically compacted.

As an example, management circuitry such as the management circuitry 810 may be configured to account for battery type. For example, where a battery includes at least one electrode formed using particles with a multimodal PSD, such information may be accounted for, for example, as to stress. As an example, a battery that includes at least one electrode with lesser residual stress than a compacted electrode, one or more limits of management circuitry may be adjusted (e.g., as to charging, discharging, etc.) that take advantage of the lesser residual stress (e.g., as to risk of swelling, damage, etc.). As an example, the management circuitry 810 may be configured with settings for a battery with an electrode formed via compaction and settings for a battery with an electrode formed without compaction (e.g., with particles having a multimodal PDS). As an example, while energy density may be the same for such different types of batteries, one or more management circuitry settings may differ (e.g., to account for residual stress or lack thereof).

Figure 9:
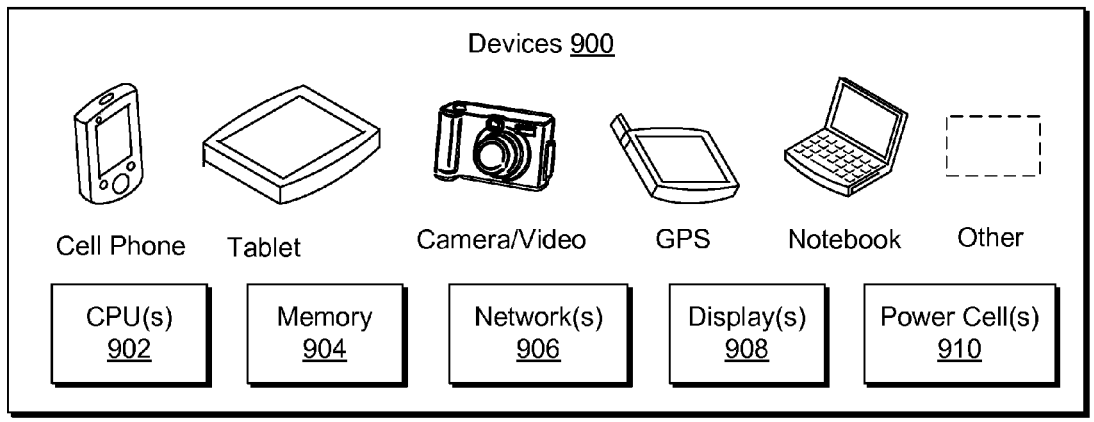
FIG. 9 is a diagram of examples of devices.
Figure 9:
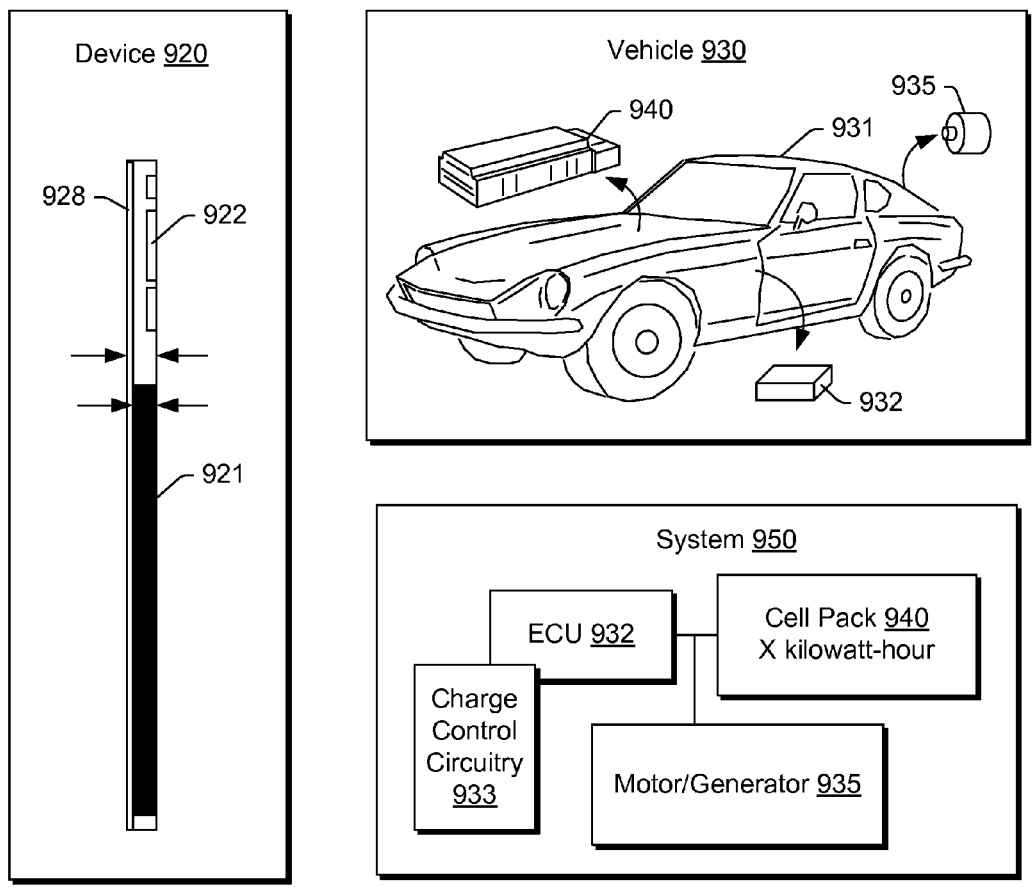

FIG. 9 shows some examples of devices 900 that may be powered by a lithium-ion cell or cells. For example, a cell phone, a tablet, a camera, a GPS device, a notebook computer, or other device may be powered by a lithium-ion cell or cells. As to other devices, a device may be an electric motor of an electric vehicle or a hybrid vehicle. A device may be an automobile, a toy, a remote control device (e.g., a bomb sniffers, drones, etc.), etc. A device may include one or more processors 902, memory 904, one or more network interfaces 906, one or more displays 908 and, as a power source, one or more lithium-ion cells 910.

As an example, a device 920 may include a power cell(s) 921, circuitry 922 and a display 928. In such an example, the thickness of the device 920 may be determined largely by a thickness of the power cell(s) 921. For example, about 80 percent of the overall thickness of the device 920 may be determined by a thickness of the power cell(s) 921. As an example, the power cell(s) 921 may include one or more electrodes formed by active electrode particles that may exhibit a multimodal PSD, for example, to achieve a desired ED.

FIG. 9 also shows an example of a vehicle 930 that includes an engine control unit (ECU) 932, a cell pack 940 and an electric motor and generator 935 and an example of a system 950 for the vehicle 930 that includes the ECU 932, the cell pack 940, the electric motor and generator 935 and charge control circuitry 933 (e.g., which may be part of the ECU 932). The vehicle 930 may include, for example, one or more processors, memory, etc.

As an example, the vehicle 930 may be a hybrid electric vehicle (HEV) where the cell pack 940 is rated at about 1.4 kWh, for example, to absorb braking energy for immediate re-use in an acceleration cycle (e.g., using the electric motor and generator 935 as a generator in a regenerative braking scheme). As an example, the vehicle 930 may be a plug-in hybrid electric vehicle (PHEV) where the cell pack 940 is rated at about 5.2 to 16 kWh, for example, to offer both hybrid and electric drive functions. As an example, the vehicle 930 may be a battery electric vehicle (BEV) where the cell pack 940 is rated at about 24 to 85 kWh to propel the vehicle 930.

As an example, the cell pack 940 may include one or more electrodes formed by active electrode particles that may exhibit a multimodal PSD, for example, to achieve a desired ED.

As an example, a lithium-ion cell may include at least one electrode that includes packed active electrode particles that have a multimodal particle size distribution (PSD) and a packing density greater than approximately 0.56. As mentioned, as an example, a so-called random loose packing (RLP) may have, for uniform spheres, a packing fraction in the limit of zero gravity of about 0.44 (e.g., void fraction of about 0.56); whereas, a so-called random close packing (RCP) may have, for uniform spheres, a packing fraction of about 0.64 (e.g., void fraction of about 0.36). A packing density of about 0.56 may correspond to a porosity of about 44 percent. As indicated in the plot 210 of FIG. 2, decreasing porosity may correspond to increasing energy density. As indicated in the plot 230 of FIG. 2, decreasing porosity may mitigate reductions in energy density associated with decreasing thickness. As explained with respect to FIG. 9, as an example, an ability to mitigate such reductions may provide for thinner devices (e.g., with suitable energy capacity).

As an example, a lithium-ion cell that includes at least one electrode that includes packed active electrode particles that have a multimodal particle size distribution (PSD) and a packing density greater than approximately 0.56 may have a targeted energy density. For example, the multimodal particle size distribution may be based on a targeted energy density (e.g., where packing density achieves, at least in part, a desired energy density).

As an example, a lithium-ion cell may include packed active electrode particles that have a multimodal particle size distribution (PSD) and a packing density that is greater than a random close packing (RCP) density for monodisperse spherical particles.

As an example, packed active electrode particles may include a first population of particles with a first particle size distribution (PSD) that forms a lattice with interstices occupied by a second population of particles with a second particle size distribution (PSD) where a maximum frequency particle size of the second particle size distribution (PSD) is less than a maximum frequency particle size of the first particle size distribution (PSD).

As an example, a maximum frequency particle size of a first particle size distribution (PSD) and a maximum frequency particle size of a second particle size distribution (PSD) may correspond to a volumetric energy density (e.g., optionally a targeted volumetric energy density).

As an example, a packing density may correspond to a dimension ratio of a first population of particles to a second population of particles and volume fractions of the first population of particles and the second population of particles.

As an example, a ratio of a maximum frequency particle size of a first particle size distribution to a maximum frequency particle size of a second particle size distribution may be equal to or greater than approximately 7; may be equal to or greater than approximately 10 and wherein the packing density is equal to or greater than approximately 0.67; may be equal to or greater than approximately 20 and wherein the packing density is equal to or greater than approximately 0.68; or may be equal to or greater than approximately 50 and wherein the packing density is equal to or greater than approximately 0.7. For example, consider the plot 410 of FIG. 4, which shows some examples of relationships between a ratio and porosity, for example, where packing density plus porosity may be approximately unity (e.g., about 1 or about 100 percent). As an example, a ratio of a maximum frequency particle size of a first particle size distribution to a maximum frequency particle size of a second particle size distribution may be equal to or greater than approximately a number that determines whether packing is disturbing or nondisturbing.

As an example, a ratio of a maximum frequency particle size of a first particle size distribution to a maximum frequency particle size of a second particle size distribution may be less than approximately 7. In such an example, the particles may be "disturbing" in their packing.

As an example, a lithium-ion cell may include at least one electrode that includes a saturated mixture of active electrode particles where the particles have a multimodal particle size distribution (PSD) and a packing density greater than approximately 0.56. For example, a population or populations of particles may pack in a volume filling manner (at a packing density) into interstices of a population of larger sized particles. As mentioned, as an example, a mixture of particles may be considered a saturated mixture where, for example, sufficient small particles are added to just "fill" (pack into) the void fraction between the large particles.

As an example, a lithium-ion cell may include packed active electrode particles (e.g., with a multimodal particle size distribution (PSD)) that are gravity packed active electrode particles. As an example, gravity packed particles may be considered uncompacted particles in that additional external compressive force is not applied, for example, in an effort to increase their density (e.g., decrease porosity). As mentioned, application of compressive force may result in trapped stress, which, in turn, may be detrimental to longevity, cycling, etc. of an electrode.

As an example, a lithium-ion cell may include packed active electrode particles (e.g., with a multimodal particle size distribution (PSD)) that are uncompacted packed active electrode particles.

As an example, a packing density for active electrode particles with a multimodal particle size distribution (PSD) may correspond to a target volumetric energy density (e.g., a targeted volumetric energy density).

As an example, lithium-ion cell may include at least one electrode that is an anode, for example, formed by particles with a multimodal particle size distribution (PSD). As an example, lithium-ion cell may include at least one electrode that is a cathode, for example, formed by particles with a multimodal particle size distribution (PSD). As an example, a battery may include one or more of such electrodes. As an example, a battery may include one or more of such lithium-ion cells.

As an example, a method may include providing a first slurry that includes a solvent and a first population of active electrode particles with a first particle size distribution with a maximum frequency particle size; providing a second slurry that includes a solvent and a second population of active electrode particles with a second particle size distribution with a maximum frequency particle size that differs from the maximum frequency particle size of the first population of active electrode particles; combining the first slurry and the second slurry to form a combined slurry; and covering a film with the combined slurry to form an electrode. In such an example, the method may include adding binder to the combined slurry and/or, for example, evaporating the solvent after covering the film.

As an example, a method may include providing a target energy density (e.g., target volumetric energy density) and a model (see, e.g., FIGS. 6 and 7) where the model may output information for making an electrode or electrodes for a lithium-ion cell, cells, etc. For example, the aforementioned method that includes covering a film with a combined slurry to form an electrode may form individual slurries based on output information form a model, the output information being based at least in part on a target energy density.

The term "circuit" or "circuitry" is used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions. Such circuitry may optionally rely on one or more computer-readable media that includes computer-executable instructions. As described herein, a computer-readable medium may be a storage device (e.g., a memory card, a storage disk, etc.) and referred to as a computer-readable storage medium. As an example, a computer-readable medium may be a computer-readable medium that is not a carrier wave.

Figure 10:
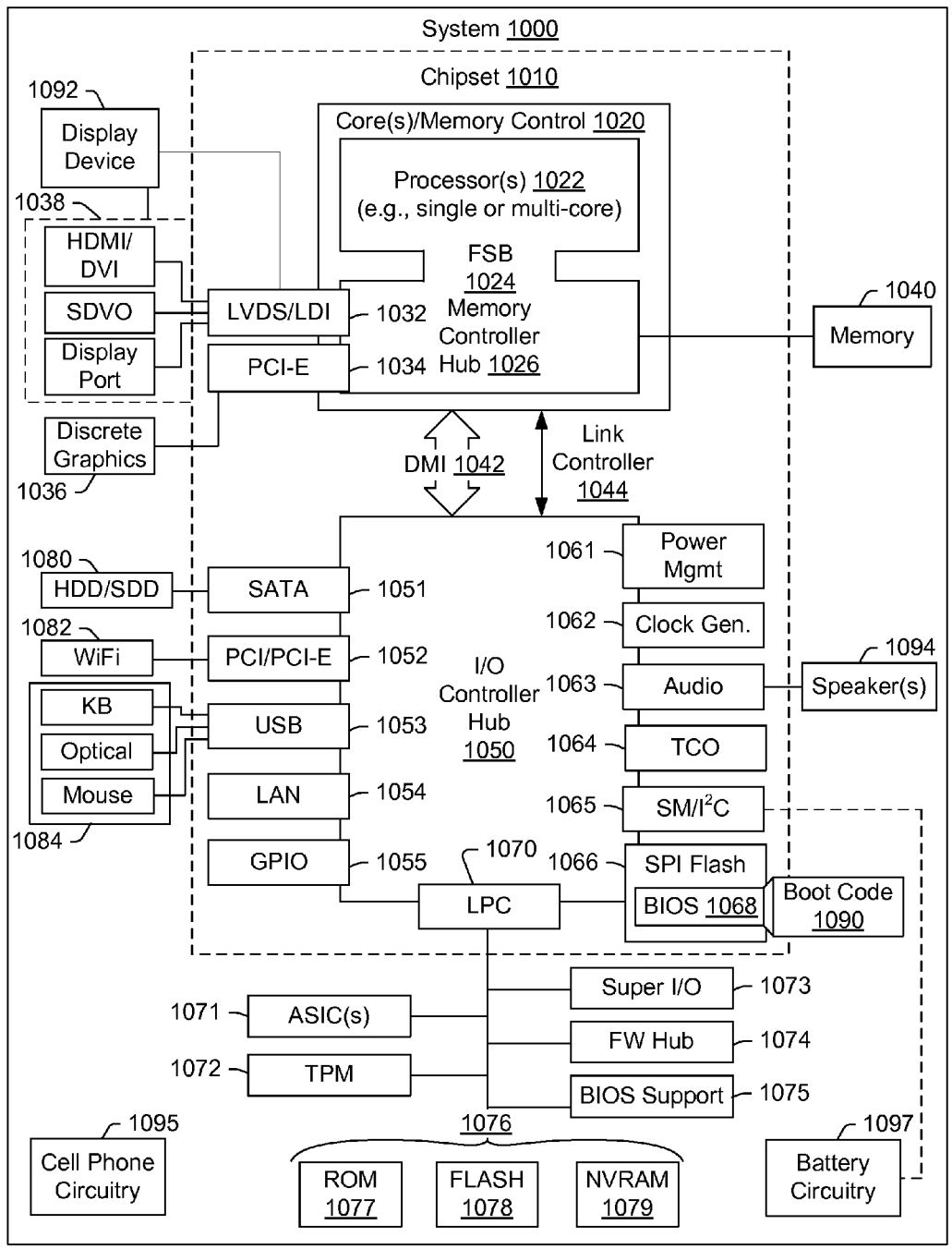
FIG. 10 is a diagram of an example of a system that includes one or more processors.

While various examples of circuits or circuitry have been discussed, FIG. 10 depicts a block diagram of an illustrative computer system 1000. The system 1000 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a satellite, a base, a server or other machine may include other features or only some of the features of the system 1000. As described herein, a device such as one of the devices 900 of FIG. 9 may include at least some of the features of the system 1000.

As shown in FIG. 10, the system 1000 includes a so-called chipset 1010. A chipset refers to a group of integrated circuits, or chips, that are designed (e.g., configured) to work together. Chipsets are usually marketed as a single product (e.g., consider chipsets marketed under the brands INTEL®, AMD®, etc.).

In the example of FIG. 10, the chipset 1010 has a particular architecture, which may vary to some extent depending on brand or manufacturer. The architecture of the chipset 1010 includes a core and memory control group 1020 and an I/O controller hub 1050 that exchange information (e.g., data, signals, commands, etc.) via, for example, a direct management interface or direct media interface (DMI) 1042 or a link controller 1044. In the example of FIG. 10, the DMI 1042 is a chip-to-chip interface (sometimes referred to as being a link between a "northbridge" and a "southbridge").

The core and memory control group 1020 include one or more processors 1022 (e.g., single core or multi-core) and a memory controller hub 1026 that exchange information via a front side bus (FSB) 1024. As described herein, various components of the core and memory control group 1020 may be integrated onto a single processor die, for example, to make a chip that supplants the conventional "northbridge" style architecture.

The memory controller hub 1026 interfaces with memory 1040. For example, the memory controller hub 1026 may provide support for DDR SDRAM memory (e.g., DDR, DDR2, DDR3, etc.). In general, the memory 1040 is a type of random-access memory (RAM). It is often referred to as "system memory".

The memory controller hub 1026 further includes a low-voltage differential signaling interface (LVDS) 1032. The LVDS 1032 may be a so-called LVDS Display Interface (LDI) for support of a display device 1092 (e.g., a CRT, a flat panel, a projector, etc.). A block 1038 includes some examples of technologies that may be supported via the LVDS interface 1032 (e.g., serial digital video, HDMI/DVI, display port). The memory controller hub 1026 also includes one or more PCI-express interfaces (PCI-E) 1034, for example, for support of discrete graphics 1036. Discrete graphics using a PCI-E interface has become an alternative approach to an accelerated graphics port (AGP). For example, the memory controller hub 1026 may include a 16-lane (x16) PCI-E port for an external PCI-E-based graphics card. A system may include AGP or PCI-E for support of graphics. As described herein, a display may be a sensor display (e.g., configured for receipt of input using a stylus, a finger, etc.). As described herein, a sensor display may rely on resistive sensing, optical sensing, or other type of sensing.

The I/O hub controller 1050 includes a variety of interfaces. The example of FIG. 10 includes a SATA interface 1051, one or more PCI-E interfaces 1052 (optionally one or more legacy PCI interfaces), one or more USB interfaces 1053, a LAN interface 1054 (more generally a network interface), a general purpose I/O interface (GPIO) 1055, a low-pin count (LPC) interface 1070, a power management interface 1061, a clock generator interface 1062, an audio interface 1063 (e.g., for speakers 1094), a total cost of operation (TCO) interface 1064, a system management bus interface (e.g., a multi-master serial computer bus interface) 1065, and a serial peripheral flash memory/controller interface (SPI Flash) 1066, which, in the example of FIG. 10, includes BIOS 1068 and boot code 1090. With respect to network connections, the I/O hub controller 1050 may include integrated gigabit Ethernet controller lines multiplexed with a PCI-E interface port. Other network features may operate independent of a PCI-E interface.

The interfaces of the I/O hub controller 1050 provide for communication with various devices, networks, etc. For example, the SATA interface 1051 provides for reading, writing or reading and writing information on one or more drives 1080 such as HDDs, SDDs or a combination thereof. The I/O hub controller 1050 may also include an advanced host controller interface (AHCI) to support one or more drives 1080. The PCI-E interface 1052 allows for wireless connections 1082 to devices, networks, etc. The USB interface 1053 provides for input devices 1084 such as keyboards (KB), one or more optical sensors, mice and various other devices (e.g., microphones, cameras, phones, storage, media players, etc.). On or more other types of sensors may optionally rely on the USB interface 1053 or another interface (e.g., I$^2$C, etc.). As to microphones, the system 1000 of FIG. 10 may include hardware (e.g., audio card) appropriately configured for receipt of sound (e.g., user voice, ambient sound, etc.).

In the example of FIG. 10, the LPC interface 1070 provides for use of one or more ASICs 1071, a trusted platform module (TPM) 1072, a super I/O 1073, a firmware hub 1074, BIOS support 1075 as well as various types of memory 1076 such as ROM 1077, Flash 1078, and non-volatile RAM (NVRAM) 1079. With respect to the TPM 1072, this module may be in the form of a chip that can be used to authenticate software and hardware devices. For example, a TPM may be capable of performing platform authentication and may be used to verify that a system seeking access is the expected system.

The system 1000, upon power on, may be configured to execute boot code 1090 for the BIOS 1068, as stored within the SPI Flash 1066, and thereafter processes data under the control of one or more operating systems and application software (e.g., stored in system memory 1040). An operating system may be stored in any of a variety of locations and accessed, for example, according to instructions of the BIOS 1068. Again, as described herein, a satellite, a base, a server or other machine may include fewer or more features than shown in the system 1000 of FIG. 10. Further, the system 1000 of FIG. 10 is shown as optionally include cell phone circuitry 1095, which may include GSM, CDMA, etc., types of circuitry configured for coordinated operation with one or more of the other features of the system 1000. Also shown in FIG. 10 is battery circuitry 1097, which may provide one or more battery, power, etc., associated features (e.g., optionally to instruct one or more other components of the system 1000). As an example, a SMBus may be operable via a LPC (see, e.g., the LPC interface 1070), via an I$^2$C interface (see, e.g., the SM/I$^2$C interface 1065), etc.

CONCLUSION

Although examples of methods, devices, systems, etc., have been described in language specific to structural features and/or methodological acts, it is to be understood that the subject matter defined in the appended claims is not necessarily limited to the specific features or acts described. Rather, the specific features and acts are disclosed as examples of forms of implementing the claimed methods, devices, systems, etc.

What is claimed is:

1. A lithium-ion cell comprising at least one electrode that comprises packed active electrode particles that comprise a multimodal particle size distribution (PSD) and a packing density greater than approximately 0.56 wherein the packed active electrode particles comprise a first population of particles with a first particle size distribution (PSD) that forms a lattice with interstices occupied by a second population of particles with a second particle size distribution (PSD) wherein a maximum frequency particle size of the second particle size distribution (PSD) is less than a maximum frequency particle size of the first particle size distribution (PSD).

2. The lithium-ion cell of claim 1 wherein the packing density is greater than a random close packing (RCP) density for monodisperse spherical particles.

3. The lithium-ion cell of claim 1 wherein the maximum frequency particle size of the first particle size distribution (PSD) and wherein the maximum frequency particle size of the second particle size distribution (PSD) correspond to a volumetric energy density.

4. The lithium-ion cell of claim 1 wherein the packing density corresponds to a dimension ratio of the first population of particles to the second population of particles and volume fractions of the first population of particles and the second population of particles.

5. The lithium-ion cell of claim 1 wherein the ratio of the maximum frequency particle size of the first particle size distribution to the maximum frequency particle size of the second particle size distribution is equal to or greater than approximately 7.

6. The lithium-ion cell of claim 5 wherein the ratio is equal to or greater than approximately 10 and wherein the packing density is equal to or greater than approximately 0.67.

7. The lithium-ion cell of claim 5 wherein the ratio is equal to or greater than approximately 20 and wherein the packing density is equal to or greater than approximately 0.68.

8. The lithium-ion cell of claim 5 wherein the ratio is equal to or greater than approximately 50 and wherein the packing density is equal to or greater than approximately 0.7.

9. The lithium-ion cell of claim 1 wherein the ratio of the maximum frequency particle size of the first particle size distribution to the maximum frequency particle size of the second particle size distribution is less than approximately 7.

10. The lithium-ion cell of claim 1 wherein the at least one electrode comprises a saturated mixture of the active electrode particles.

11. The lithium-ion cell of claim 1 wherein the packed active electrode particles comprise gravity packed active electrode particles.

12. The lithium-ion cell of claim 1 wherein the packed active electrode particles comprise uncompacted packed active electrode particles.

13. The lithium-ion cell of claim 1 wherein packing density corresponds to a target volumetric energy density.

14. The lithium-ion cell of claim 1 wherein the at least one electrode comprises an anode.

15. The lithium-ion cell of claim 1 wherein the at least one electrode comprises a cathode.

16. The lithium-ion cell of claim 1 wherein the active electrode particles comprise lithium and at least one metal oxide.

17. The lithium-ion cell of claim 1 wherein the active electrode particles comprise a member selected from a group consisting of lithium cobalt oxide ($LiCoO_2$), lithium nickel oxide ($LiNiO_2$), lithium manganese oxide ($LiMn_2O_4$), and lithium iron phosphate ($LiFePO_4$).

18. The lithium-ion cell of claim 1 wherein the maximum frequency particle size of the second particle size distribution (PSD) and the maximum frequency particle size of the first particle size distribution (PSD) are less than approximately 15 microns.

19. The lithium-ion cell of claim 1 wherein the maximum frequency particle size of the second particle size distribution (PSD) and the maximum frequency particle size of the first particle size distribution (PSD) are in a range from about 0.015 microns to about 15 microns.

20. A battery comprising:
a lithium-ion cell comprising at least one electrode that comprises packed active electrode particles that comprise a multimodal particle size distribution (PSD) and a packing density greater than approximately 0.56wherein the packed active electrode particles comprise a first population of particles with a first particle size distribution (PSD) that forms a lattice with interstices occupied by a second population of particles with a second particle size distribution (PSD) wherein a maximum frequency particle size of the second particle size distribution (PSD) is less than a maximum frequency particle size of the first particle size distribution (PSD).

21. The battery of claim 20 comprising a plurality of the lithium-ion cells.

22. The battery of claim 20 wherein the active electrode particles comprise lithium and at least one metal oxide.

23. The battery of claim 20 wherein the maximum frequency particle size of the second particle size distribution (PSD) and the maximum frequency particle size of the first particle size distribution (PSD) are in a range from about 0.015 microns to about 15 microns.

24. A device comprising:
a lithium-ion cell comprising at least one electrode that comprises packed active electrode particles that comprise a multimodal particle size distribution (PSD) and a packing density greater than approximately 0.56wherein the packed active electrode particles comprise a first population of particles with a first particle size distribution (PSD) that forms a lattice with interstices occupied by a second population of particles with a second particle size distribution (PSD) wherein a maximum frequency particle size of the second particle size distribution (PSD) is less than a maximum frequency particle size of the first particle size distribution (PSD);
a processor electrically connected to the lithium-ion cell; and
memory accessible by the processor.

25. The device of claim 24 comprising a plurality of the lithium-ion cells.

26. The device of claim 24 wherein the active electrode particles comprise lithium and at least one metal oxide.

27. The device of claim 24 wherein the maximum frequency particle size of the second particle size distribution (PSD) and the maximum frequency particle size of the first particle size distribution (PSD) are in a range from about 0.015 microns to about 15 microns.

* * * * *